United States Patent [19]

Miyazaki et al.

[11] Patent Number: 4,837,759
[45] Date of Patent: Jun. 6, 1989

[54] OPTICAL INFORMATION RECORDER

[75] Inventors: Hidehiro Miyazaki; Kazuto Shingai; Susumu Ohsawa, all of Yamanashi, Japan

[73] Assignees: Pioneer Electronic Corporation; Pioneer Video Corporation, both of Japan

[21] Appl. No.: 97,559

[22] Filed: Sep. 16, 1987

[30] Foreign Application Priority Data

Sep. 16, 1986 [JP] Japan ................................ 61-218698

[51] Int. Cl.4 .......................... G11B 7/00; G11B 21/08
[52] U.S. Cl. ........................................ 369/32; 369/45; 250/201
[58] Field of Search ........................ 369/32, 45, 46, 50; 250/201 DF

[56] References Cited

U.S. PATENT DOCUMENTS

| 4,342,935 | 8/1982 | Kallmeyer et al. | 369/45 X |
| 4,363,116 | 12/1982 | Kleuters et al. | 369/30 |
| 4,626,673 | 12/1986 | Struye | 250/201 DF |
| 4,677,603 | 6/1987 | Kenjyo | 369/45 X |

Primary Examiner—William L. Sikes
Assistant Examiner—Akm E. Ullah
Attorney, Agent, or Firm—Sughrue, Mion, Zinn, Macpeak & Seas

[57] ABSTRACT

An optical information recorder in which a focusing unit is coupled through a piezoelectric unit to a screw driven carriage. The screw is used for rough adjustment and the piezoelectric unit for fine adjustment.

7 Claims, 4 Drawing Sheets

OPTICAL INFORMATION RECORDER

BACKGROUND OF THE INVENTION

1. Field of the Invention

The present invention relates to an optical information recorder, particularly to a device for recording information on a resist matrix by using a laser beam.

2. Background of the Invention

There is an optical system for recording video or audio information or the like on a disk-like recording medium. In the system, a photoresist is applied to a glass disk as a base plate to manufacture a resist matrix A focused laser beam irradiates the film of the photoresist on the resist matrix, with bit-by bit intensity modulation, depending on the information or the like to expose the film. The film is thereafter developed to have pits having various lengths and repetition periods to correspond to the information or the like. The information is thus recorded on the medium.

A conventional recorder called a cutting machine is used to record the information on the resist matrix in the optical system. In the recorder, a focusing unit converges the information recording beam onto the surface of the resist matrix. The focusing unit is supported by a carriage which is moved in the radial direction of the matrix by a drive mechanism a motor, a speed reducer and a moving screw which is rotated by the motor whose rotational frequency is controlled to regulate the speed of the movement of the carriage. Since the speed of the movement of the focusing unit is regulated only through the control of the rotational frequency of the carriage drive motor while the characteristics of the moving screw and the speed reducer which is coupled to the motor are not taken into consideration, there is a problem that the pitch between track portions (pit row portions) is made irregular due to the drive mechanism characteristics.

SUMMARY OF THE INVENTION

The present invention was made in order to solve the above mentioned problem.

Accordingly, it is an object of the present invention to provide an optical information recorder in which the characteristics of a whole drive mechanism for moving a carriage are taken into consideration to control the position of a focusing unit to always keep the pitch between track portions constant during the recording of information on a recording medium.

The optical information recorder of the invention comprises a means for roughly adjusting the moved position of the focusing unit in the radial direction of the recording matrix by driving the carriage supporting the focusing unit and another means for finely adjusting the moved position of the focusing unit in the radial direction of the matrix. The moved position of the focusing unit in the radial direction of the recording matrix is measured. The rough and the fine adjustment means are driven and controlled depending on information on the measured moved position so as to regulate the moved position of the focusing unit in the radial direction of the recording matrix to always move a cutting beam at a constant rate. The pitch between the track portions is thus always kept constant during the recording of the information on the matrix.

DETAILED DESCRIPTION OF THE PREFERRED EMBODIMENT

An embodiment of the present invention is hereafter described in detail with reference to the drawings.

Figure 1:
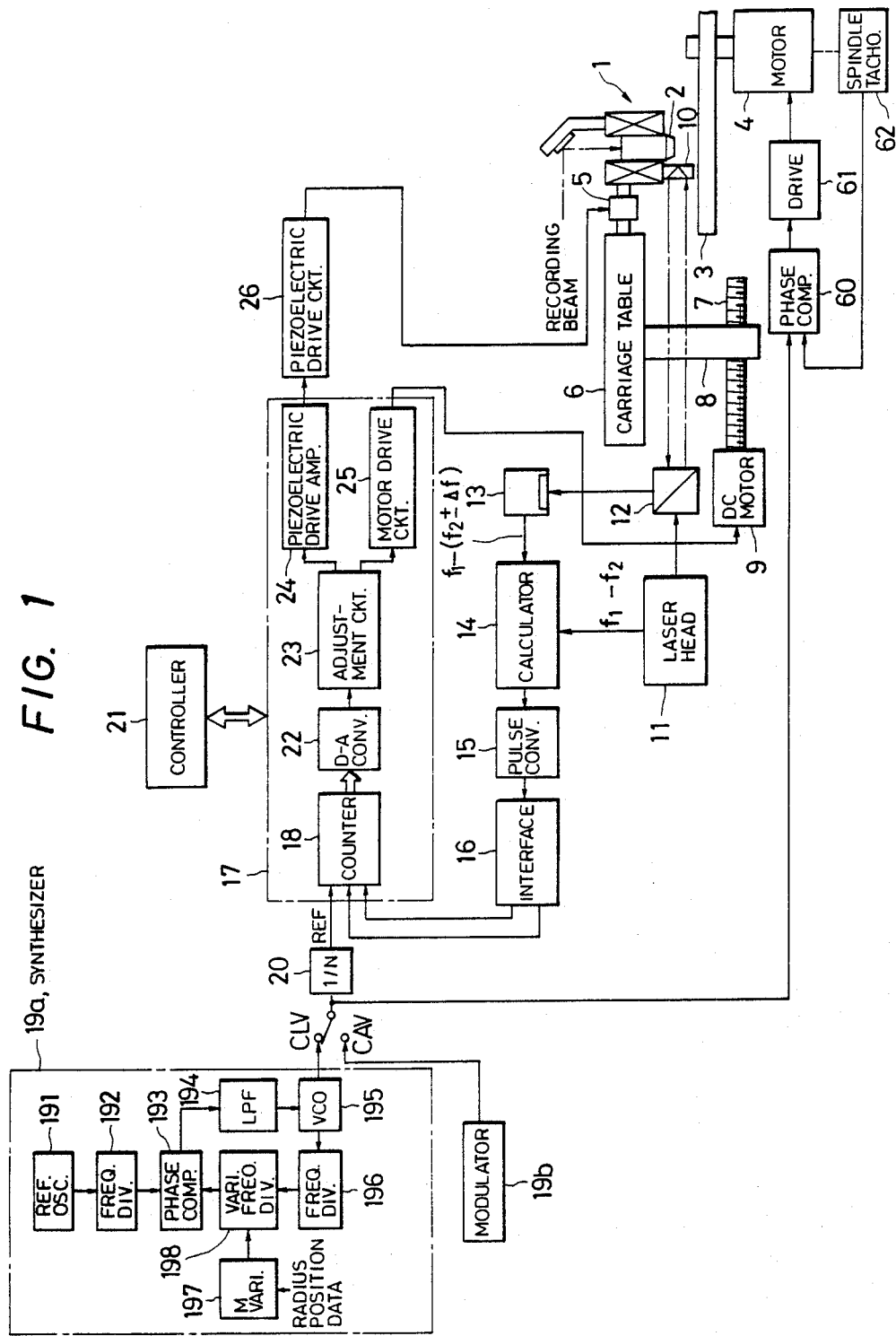
FIG. 1 shows a block diagram of an embodiment of the present invention.

In the embodiment shown in FIG. 1, a laser beam is converged onto the surface of a recording resist matrix 3 by an objective lens 2 of a focusing unit 1 as the laser beam is blinked by an optical modulator (not shown in the drawings) depending on video or audio information or the like. At that time, the resist matriz 3 is being rotated by a spindle motor 4.

The focusing unit 1 is supported with a piezoelectric element 5 on a cariage 6. The piezoelectric element 5 constitutes a fine adjustment means in which an electric field is applied to a crystal to cause a strain therein to finely adjust the moved position of the focusing unit 1 in the radial direction of the resist matrix 3.

The carriage 6 can be moved along a guide rail (not shown in the drawings) extending in the radial direction of the resist matrix 3. The carriage 6 is screw-coupled to a moving screw 7 through a coupling member 8. The moving screw 7 can be rotated by a DC motor 9 couple to a speed reducer. The carriage 6, the moving screw 7, the DC motor 9 and so forth consititute a means for roughly adjusting the moved position of the focusing unit 1 in the radial direction of the resist matrix 3.

A position measuring unit includes a corner reflector 10 secured to the focusing unit 1, a laser head 11, a laser interferometer 12, a light detector 13 and a calculation circuit 14. This position measuring unit measures the moved position of the focusing unit 1 in the radial direction of the resist matrix 3. In the position measuring unit 1, two different light wavelengths are used to cause an interference pattern during the movement of the reflector 10 from the start point thereof along with the movement of the focusing unit 1. The number of the light and dark stripes of the interference pattern are counted to measure the displacement of the focusing unit 1. The constitution and operation of the position measuring unit are described in detail from now on.

Figure 2:
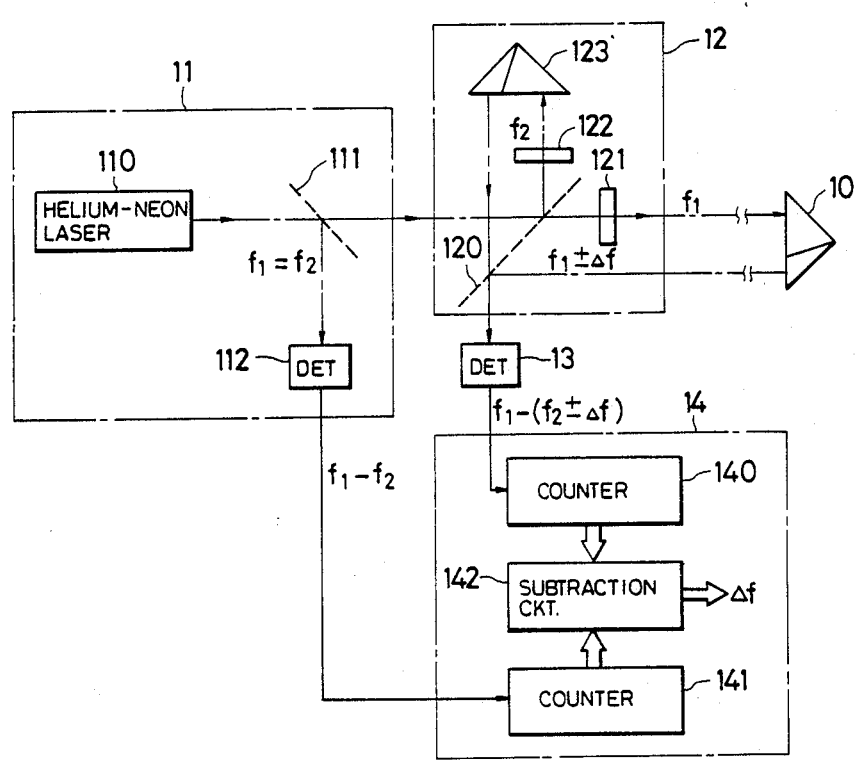
FIG. 2 shows a schematic view of a position measuring unit in the embodiment.

As shown in FIG. 2, a helium-neon laser 110, which is a light source, generates two circularly polarized light beams which have frequencies $f_1$ and $f_2$ and are divided by a beam splitter 111. One of the divided posrtions of each of the beams proceeds to a light detector 112 and is converted into an electric beat signal of frequency $(f_1 - f_2)$ for reference. The other of the divided portions proceeds to the interferometer 12 ànd is divided into a part of a frequency $f_1$ and an other part of a frequency $f_2$ by a beam splitter 120. The part of the frequency $f_1$ proceeds to the reflector 10 through a polarizing plate 121, while the other part of the frequency $f_2$ proceeds to a fixed mirror 123 through an other polarizing 122. The refrector 10 is made of a corner cube prism, a cat's-eye or the like so that the incoming light to the reflector is sure to be parallel with the output light reflected thereby. The frequency of the light reflected by the reflector 10 changes by Δf depending on the rate of movement of the reflector 10. The light reflected by the reflector 10 and the other light reflected by the fixed mirror 123 are combined at the beam splitter 120 so that the combined light proceeds to the light detector 13. As a result, the light detector 13 generates a beat signal having a frequency $f_1-(f_2 \pm \Delta f)$. The beat signal from the light detector 13 is sent to a counter 140 and counted, while the beat signal for reference is sent from the light detector 112 to another counter 141 and counted. A subraction circuit 142 determines the difference N between the value counted by the counter 140 and that counted by the other counter 141. The difference N is multiplied by a half of the wavelenght $\lambda_1$ of the light sent to the reflector 10. The product $(\lambda_1/2)$ N is equal to the quantity l of movement of forusing unit 1 since the beginning of counting.

Returning to FIG. 1, a pulse converter 15 changes the product $(\lambda_1/2)$ N into a train of pulse signals UP-PULS or DW-PULS which corresponds to the direction of the movement of the focusing unit 1 and which is supplied to the counter circuit 18 of a servo circuit 17 through an interface 16. A signal is sent from a synthesizer 19a or a modulator19b depending on whether the recording mode is constant line velocity CLV or constant angular velocity CAV.

The synthesizer 19a includes a reference oscillator 191, a frequency divider 192, a phase comparator 193, a low-pass filter (LPF) 194, a voltage-controlled oscillator 195, a frequency divider 196, an M variable circuit 197, and a variable frequency divider or programmable counter 198. The reference oscillator 191 generates a signal having a reference frequency. The frequency divider 192 receives the reference frequency signal from the reference oscillator 191 and frequency-divides it. The output of the frequency divider 192 is supplied to one input of the phase comparator 193 in which a phase comparison is carried out with an output of the variable frequency divider 197 applied to the other input of the phase comparator 193. An output signal of the phase comparator 193 is applied through the LPF 194 to the VCO 195. A frequency of an output signal from the VCO 195 is controlled by the output of the LPF 194, and is frequency-divided in the frequency divider 196. The output of the frequency divider 196 is applied to one input of the variable frequency divider 198 and the output of the M variable circuit 197 is applied to the other input thereof. A numerical value M in the M variable circuit 198 is changed in accordance with data indicative of a radium position of the disk. Thus, the frequency of the signal fed from the frequency divider 196 to the variable frequency divider 198 is frequency-divided in accordance with the numeral M representative of the radius position. With the synthesizer thus arranged, a frequency signal corresponding to the radius position is produced from the VCO 195 and applied to the frequency divider 20 through the CLV tap.

The modulator 19b provides a frequency signal representative of a constant angular velocity by extracting horizontal sync signals from the video signal being recorded.

The signal either from the synthesizer 19a or from the modulator 19b is sent to the frequency divider 20 where this signal is frequency-divided by N so that a frequency signal is obtained and entered as a reference signal into the counter circuit 18. This signal is further applied to one input of a phase comparartor 60 where a phase comparison is carried out with an actual number of revolutions of the spindle. The output of the phase comparator 60 is applied to a driving circuit 61 to drive the spindle motor 4. A spindle tachometer 62 is disposed in association with the spindle motor 5 to detect the actual number of revolutions of the spindle motor 4. With this arrangement, the D.C. motor 9 and the spindle motor 4 are in synchronism with each other, since both motors are controlled so as to be synchronized based on the same reference signal.

Figure 3:
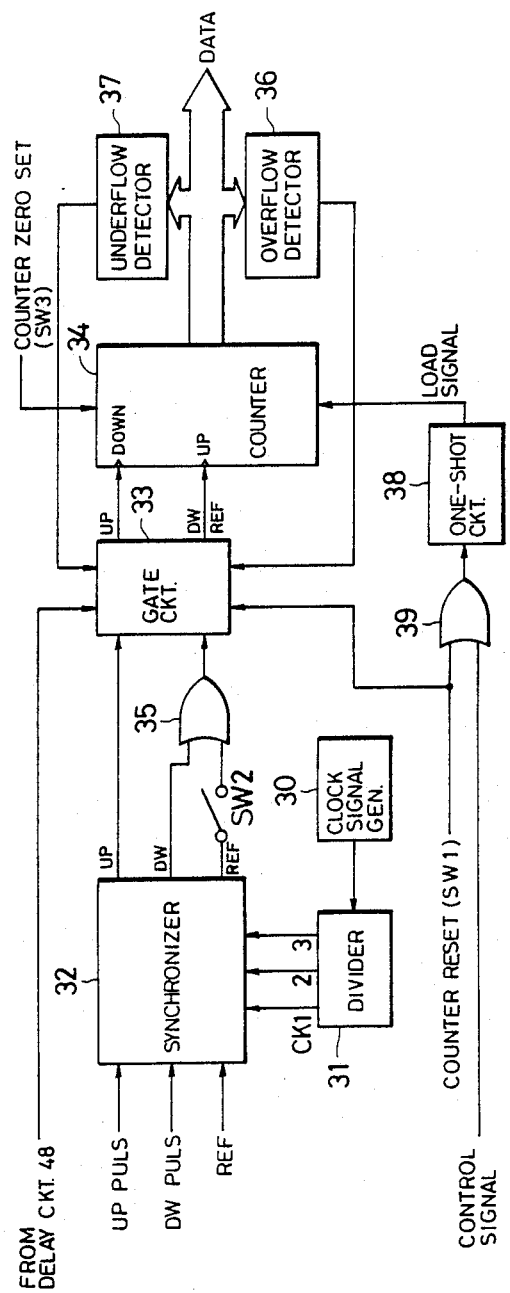
FIG. 3 shows a block diagram of a counter circuit in the embodiment.

FIG. 3 shows the constitution of the counter circuit 18. A clock signal produced by a clock signal generator 30 is frequency-divider into three signals CK1, CK2 and CK3 by a frequency divider 31. The signals CK1, CK2 and CK3 are supplied to a synchronizer 32. The siganls UP-PULS, DW-PULS and REF are also supplied to the synchronizer 32 so that the synchronizer sends them out as pulse signals synchronized with the clock signals CK1, CK2 and CK3. The signal UP-PULS is supplied as an input signal DOWN to a counter 34 through a gate circuit 33. the signals DW-PULS and REF are supplied to an OR circuit 35 whose output is supplied as an input signal UP to the counter 34 through the gate circuit 33. The difference between the number of the pulses of the input signal UP and that of the pulses of the input signal DOWN is sent out as output data from the counter 34. When the output data have neared the overflow or underflow limit of the counter 34, this condition is detected by an overflow detector 36 or an underflow detector 37, the detection output from which is supplied to the gate circuit 33.

Figure 4:
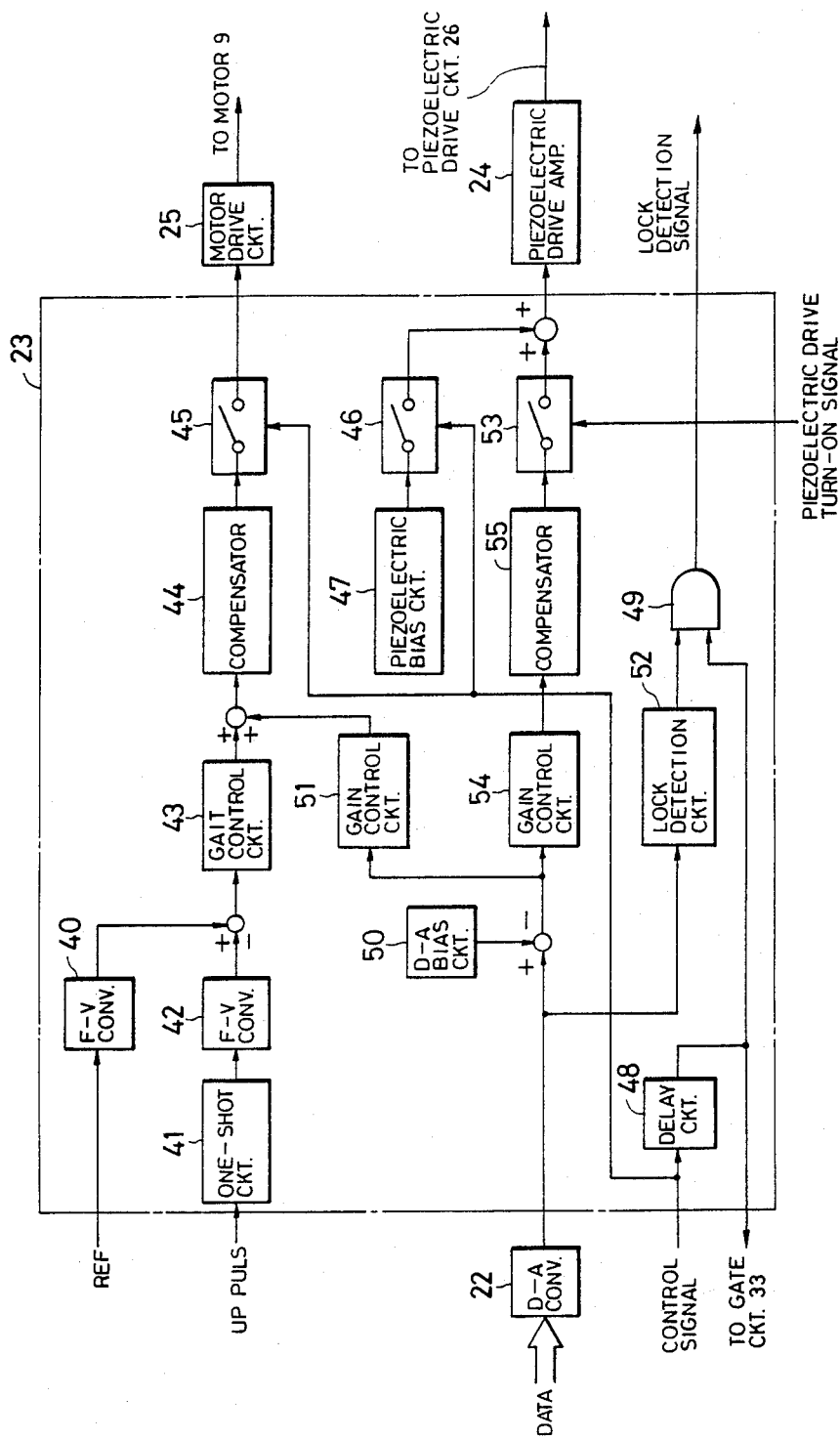
FIG. 4 shows a block diagram of an adjustment circuit in the embodiment.

When a control signal sent out from a controller 21 shown in FIG. 1 is supplied to the gate circuit 33 as the control signal is delayed by a prescribed time by a delay circuit 48 shown in FIG. 4, the signals UP-PULSE and DW-PULS or REF are passed through the gate circuit so that the counter 34 starts counting. When the gate circuit 33 is supplied with the detection output from the overflow detector 36, the passage of the signal DW-PULSE or REF through the gate circuit is prohibited so that the overflow in the counter 34 is prevented. When the gate circuit 33 is supplied with the detection output from the underflow detector 37, the passage of the signal UP-PULS through the gate circuit is prohibited so that the underflow in the counter 34 is prevented.

When the above-mentioned undelayed control signal is supplied to a one-shot sircuit 38 through an OR circuit 39, the one-shot circuit sends out a load signal to the counter 34 to set counter in an initial state. When a switch SW1 not shown in the drawings is turned on, the counter 34 is set in the inital state and starts counting. When another switch SW2 is turned on, the supply of the signal REF to the gate circuit 33 is stopped. When still another switch SW3 not shown in the drawings is turned on, the counter 34 sends out all-zero data, regardless of the state of the counter.

The output data from the counter 34 are changed into an analog signal by a D/A converter 22 shown in FIG. 1. The analog signal is supplied to a piezoelectric drive amplifier 24 and a motor drive circuit 25 through an adjustment circuit 23. The output from the amplifier 24 is converted into a drive signal for the piezoelectric element 5 by a piezoelectric drive circuit 26. The output from the motor drive circuit 25 is a drive signal for the DC motor 9.

FIG. 4 shows the constitution of the adjustment circuit 23 shown in FIG. 1. The signal REF is changed into a voltage by a frequency/voltage converter 40. The signal UP-PULS in changed into a voltage by a frequency/voltage converter 42 through a one-shot circuit 41. The difference between both the voltage is subjected to gain control by a gain control circuit 43 and then supplied to a compensation circuit 44. When the control signal is sent out from the controller 21, a switch 45 is turned on in response to the control signal so as to supply the compensation output from the compensation circuit 44 to the motor drive circuit 25 to start the DC motor 9 to begin frequency servo control. At the same time, the counter 34 shown in FIG. 3 is reset. At that time, a switch 46 is also turned on to connect a piezoelectric bias circuit 47 and the piezoelectric drive amplifier 24 to each other to supply the piezoelectric element 5 with a bias voltage changing gradually up to a predcribed level.

When a time determined in terms of terms of the delay time of the delay circuit 48 has passed since the generation of the undelayed control signal, the gate circuit 33 shown in FIG. 3 is opened in response to the control signal delayed by the delay circuit 48 so that the counter 34 starts counting. At the same time, an AND circuit 49 is opened by the delayed output from the delay circuit 48.

A bias voltage determined by a D/A bias circuit 50 is substracted from the conversion output from the D/A converter 22. The remained of the substraction operation is subjected to gain control by a gain control circuit 51 and then added to the output form the gain control circuit 43. The sum of the addition is supplied to the compensation circuit 44. The signal compensated by the compensation circuit 44 is supplied to the motor drive circuit 25 through the switch 45 to control the motor 9 to drive the moving screw 7 to roughly adjust the moved position of the focusing unit 1 in the radial direction of the resist matrix 3.

When the output voltage from the D/A converter 22 has neared a prescribed level because of the stabilization of the state for driving the movement of the focusing unit 1, the nearing is determined by a lock detection circuit 52 made of a window comparator. The detection output from the lock detection circuit 52 is supplied as a lock detection signal to the controlled 21 through the AND circuit 49. St that time, the controller 21 judges that the state of driving for the movement of the focusing unit 1 is stabilized. The controlled 21 then sends out a piezoelectric drive turn-on signal. A switch 53 is turned on in repsonse to the piezoelectric drive turn-on signal so that the conversion output from the D/A converter 22, which is subjected to gain control by a gain control circuit 54 and compensated by a compensation circuit 55, is converted into a drive signal for the piezoelectric drive circuit 26 through the piezoelectric drive amplifier 25. As a result, the piezoelectric element 5 is driven to finely adjust the moved position of the focusing unit 1 in the radial direction of the resist matrix 3.

The controlled 21 sends out various kinds of control signals to the servo circuit 17.

Although the means for finely adjusting the moved position of the focusing unit 1 in the radial direction of the resist matrix 3 is made of the pieoelectric element 5 in the above-described embodiment, the present envention is not confined thereto but the means may be made of a mechanism which displaces the objective lens 2 in the radial direction of the resist matrix 3.

What is claimed is:

1. An optical information recorder/reproducer, comprising:
   a focusing unit for converging an information beam onto a surface of a recording matrix;
   a carriage supporting said focusing unit and movable in a radial direction of said recording matrix;
   means for roughly adjusting the moved position of said focusing unit in the radial direction of said recording matrix by driving said carriage;
   means for finely adjusting the moved position of said focusing unit in the radial direction of said matrix; and
   a position measuring means for measuring a moved position of said focusing unit in the radial direction of said recording matrix and sending out information on said moved position so as to selectively drive and control said rough adjustment means and said fine adjustment means depending on said information on said moved position.

2. An optical information recorder/reproducer according to claim 1 in which said fine adjustment means is made of a piezoelectric element provided between the forcusing unit and the carriage.

3. An optical information recorder/reproducer according to claim 2, in which said rough adjusting means comprises a rotatable screw driving said carriage.

4. An optical information recorder/reproducer according to claim 1, wherein focusing unit converges an information recording beam onto said surface.

5. An optical information recorder/reproducer according to claim 1, wherein said position measuring means includes a laser head for emitting light beams, a light reflector for receiving and reflecting a light beam emitted from said laser head, and a light detector for receiving the reflected light beam from said light reflector, said light reflector being secured to said focusing unit so that said focusing unit is moved, a frequency of the light beam received by said light reflector will be different than a frequency of the light beam reflected by said light reflector, the frequency difference between the received and reflected light beam of said light reflector being a function of the rate of movement of said light reflector.

6. An optical information recorder/reproducer according to claim 5, wherein said laser head is operable for emitting first and second light beams, and wherein said position measuring means further includes an interferometer for supplying said first light beam to said light reflector and for combining the second light beam with the reflected first light beam from said light reflector to produce a combination light signal.

7. An optical information recorder/reproducer according to claim 6, wherein said light detector receives the combination light signal and converts it into a beat signal, said position measuring means further includes a calculating circuit, and wherein said laser head includes means for generating a reference beat signal from said first and second light beams, said calculating circuit received the beat signal and the reference beat signal, and being operable for determining an amount of movement of said focusing unit according to a difference between the beat and referenec beat signals.

* * * * *